(12) United States Patent
Galich et al.

(10) Patent No.: US 6,535,591 B1
(45) Date of Patent: Mar. 18, 2003

(54) METHOD FOR PROVIDING TELECOMMUNICATIONS SERVICE PRICING

(75) Inventors: Michael G. Galich, Chicago, IL (US); Terrence M. Burke, Evergreen Park, IL (US); Thomas R. Fitzsimons, Chicago, IL (US)

(73) Assignee: Insors Integrated Communications, Chicago, IL (US)

( * ) Notice: Subject to any disclaimer, the term of this patent is extended or adjusted under 35 U.S.C. 154(b) by 0 days.

(21) Appl. No.: 09/492,540

(22) Filed: Jan. 27, 2000

Related U.S. Application Data

(63) Continuation-in-part of application No. 09/432,521, filed on Nov. 3, 1999, and a continuation-in-part of application No. 09/356,287, filed on Jul. 16, 1999.

(51) Int. Cl.[7] .............................................. H04M 15/00
(52) U.S. Cl. .................. 379/112.06; 379/115; 379/119; 379/126; 379/133
(58) Field of Search ........................... 379/111, 112.01, 379/112.06, 114.01, 114.02, 114.06, 114.1, 114.12, 121.02, 126, 133–134, 115, 119; 705/5–6, 10, 26

(56) References Cited

U.S. PATENT DOCUMENTS

| | | | |
|---|---|---|---|
| 4,992,940 A | 2/1991 | Dworkin | |
| 5,260,866 A | 11/1993 | Lisinski et al. | |
| 5,493,490 A | 2/1996 | Johnson | |
| 5,615,342 A | 3/1997 | Johnson | |
| 5,752,238 A | 5/1998 | Dedrick | |
| 5,842,178 A | 11/1998 | Giovannoli | |
| 5,918,213 A | 6/1999 | Bernard et al. | |
| 6,005,926 A | * 12/1999 | Mashinsky | |
| 6,332,129 B1 | * 12/2001 | Walker et al. | |

OTHER PUBLICATIONS

MCLeodUSA Business Services, Revised Feb. 1997, all pages.*
Select Telecom Group, "Free Analysis Form and Customer Profile", circa Jan. 1998, published by the Select Telecom Group on the worldwide web at: http://www.selecttelecom./index.html.

* cited by examiner

Primary Examiner—Duc Nguyen
(74) Attorney, Agent, or Firm—Greer, Burns & Crain, Ltd.

(57) ABSTRACT

A method for providing telecommunications service pricing to a corporate client over a computer network has steps of: querying the client to choose a client profile, selecting a questionnaire profile for a questionnaire database, presenting the questionnaire to the client over the computer network, obtaining a response to the questionnaire from the client over the data network, obtaining a phone bill from the client for a period of time, and using the phone bill to determine a call traffic pattern. The call traffic pattern and the response to the questionnaire are then used to determine telecommunications service pricing over the computer network to the client.

16 Claims, 4 Drawing Sheets

METHOD FOR PROVIDING TELECOMMUNICATIONS SERVICE PRICING

CROSS REFERENCE

The present application is a Continuation-in-Part of U.S. application Ser. No. 09/356,287 filed Jul. 16, 1999; Ser. No. 09/432,521 filed Nov. 3, 1999, and an Application filed Jan. 18, 2000 by Kohler, Burke, Galich, and Bollinger entitled "method for Providing Reverse Charge Phone Service".

FIELD OF THE INVENTION

The present invention relates to methods for providing pricing for telecommunications services. In particular, the present invention relates to providing prices for telecommunications services over a computer network to corporate customers.

BACKGROUND OF THE INVENTION

The telecommunications industry in recent times has undergone rapid and significant change. Advances in technology have led to enhanced and lower cost telephony services. Also, with passage of the Telecommunications Act of 1996, the regulatory environment in the United States has loosened in an attempt to foster competition in the industry. The combination of these two occurrences has led to an unprecedented number of commercial phone services and carriers available to customers. The large number of carriers and rapidly advancing technology in combination have in turn resulted in an unprecedented level of competition in the telephony services market. Business clients in this market now must choose from a multitude of telephony services and vendors.

An important recent technological advancement that has intensified the pace of change is voice over internet protocol, or "VoIP". VoIP, which is generally the ability to transmit voice over a data line in a digital format, offers substantial savings opportunities for corporate customers. For example, companies having a plurality of geographically remote locations that are connected by a company data network can now carry intra-company phone traffic over their data network, thereby avoiding long distance carrier charges. Greater detail regarding this technology is available in co-pending U.S. application Ser. No. 09/356,287; filed Jul. 16, 1999. Using similar technology, companies may likewise realize significant savings on their reverse charge phone service by setting up points of presence in various regions and carrying the reverse charge service over a data network connecting the points of presence. Greater detail regarding this practice is available in co-pending U.S. Application filed Jan. 18, 2000 by Kohler, et al.

Rapidly advancing technology creating new services and offering generally lower telephone transmission costs have created a dynamic telecommunications services market. Quickly changing prices and wide varieties of service plans available to customers have become the norm in a highly competitive market. In order to successfully compete in this environment, telecommunications service vendors are required to quickly and frequently provide pricing proposals. To provide these proposals, vendors may be required to obtain and analyze large amounts of information. Telecommunications vendors have found it increasingly difficult to obtain the required information and to prepare a telecommunications services proposal based on this information in a timely and organized manner. Accordingly, there is an unresolved need for a method for providing pricing for telecommunications services.

OBJECTS OF THE INVENTION

It is an object of the invention to provide a method for providing telecommunications service pricing.

It is a further object of the invention to provide a method for providing telecommunications service pricing over a computer network.

SUMMARY OF THE INVENTION

The present invention generally comprises a method for providing telecommunication service pricing to a corporate client over a computer network. The method comprises the steps of: querying the client to choose a client profile from a profile group; using the client profile to choose a telecommunications service questionnaire; presenting the questionnaire to the client over the network; obtaining a response to the questionnaire from the client over the network; using the response to determine telecommunications service pricing; and providing the telecommunications service pricing over the data network to the client.

In a preferred embodiment of the method of the invention, the client profile group comprises manufacturing, professional services, and retail services. It has been discovered that clients in any one of these profiles tend to have characteristics upon which telecommunications service pricing can be established that are common to that profile. That is, once a client profile is established, particular questions for the client can be asked through a tailored questionnaire to determine information on which to base service pricing. The questionnaire may be tailored to a greater degree depending on the particular service to be provided.

For instance, in a first example embodiment of the method of the invention the telecommunications services comprise providing intra-company telephony services over a data network. The data network may be an existing company proprietary network, a "virtual private network" created specifically to carry the company voice traffic, or it may be a worldwide computer network such as the internet. In this example embodiment, the questionnaire presented to the client, regardless of the client profile, requests at least the number of geographically remote locations that are connected to the data network. In a second example embodiment of the invention, the telecommunications services comprise reverse charge phone service, and the questionnaire, regardless of the client profile, requests a reverse charge call center location.

In a third example embodiment of the method of the invention the telecommunications service also comprise providing reverse charge phone service in digital format. In this particular embodiment, however, no client profile is provided, as it has been discovered that accurate pricing can be determined for reverse charge call service without determining a client profile. A questionnaire is presented which comprises at least a request for the location of a company reverse charge call center. A company phone bill is obtained which comprises at least reverse charge call records. A call traffic pattern is then developed from the phone bill which analyzes reverse charge calls made by region of origin. Pricing is then determined for the service using the call traffic pattern and the questionnaire response, which is then transmitted to the client.

In addition to the questionnaire, the method of the invention preferably further comprises obtaining a phone bill for a period of time from the customer. It has been discovered that a client phone bill can be used to effectively examine the client's phone usage. The phone bill is preferably obtained over the data network in digital format. The method of the invention preferably further comprises developing a call traffic pattern from the phone bill, with the thus determined traffic pattern then used to determine a service price for the telecommunications service to be provided. The traffic pattern comprises an analysis of company telephone usage. Greater detail regarding call traffic patterns and determining pricing therefrom is presented in co-pending U.S. application Ser. No. 09/432,521; filed Nov. 3, 1999; herein incorporated by reference.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
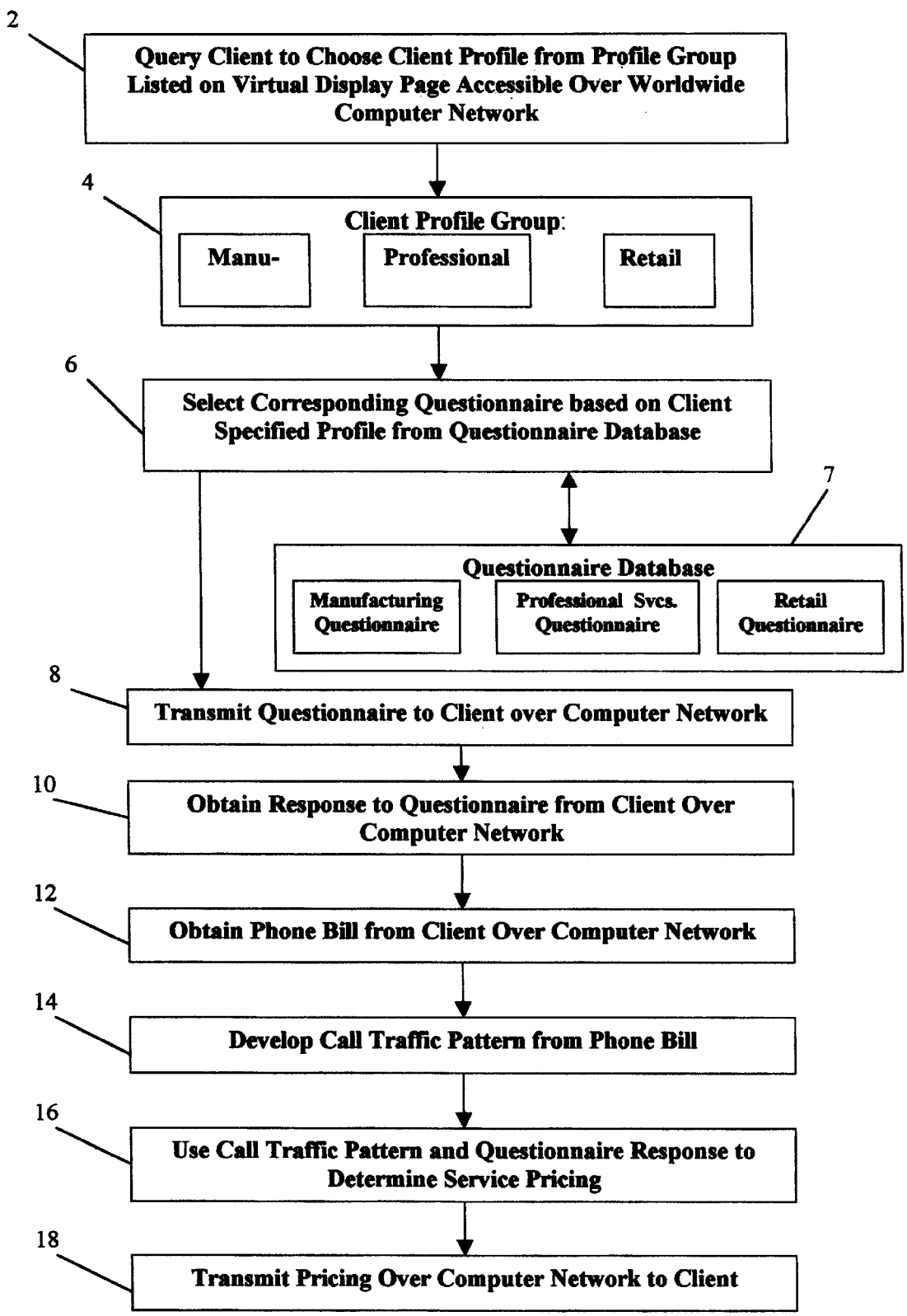
FIG. 1 is a flowchart illustrating the steps of an example embodiment of the method of the invention.

Turning now to the drawings, FIG. 1 is a flow chart illustrating the various steps of an embodiment of the method for providing telecommunications service pricing of the invention. At 2, the client is queried for a client profile as defined in a client profile group listed on a virtual page displayed on a world wide computer network. A preferred and well known example comprises a web page displayed on the world wide web. Methods for creating and transmitting such pages are also well known. Such a page provides for input and output, and for the display of a relatively large amount of information.

A preferred client profile group is listed at 4, and comprises Retail, Professional Services, and Manufacturing. Other client profiles can of course be comprised. As an example, profiles may be listed for Government, Utilities, Telecommunications, Internet Service Providers, and others. In addition, these groups may be further subdivide. As an example, the Professional Services profile may be further broken down into Law, Accounting, Insurance, and Banking. Manufacturing could likewise be subdivided into large capital equipment, consumer items, automotive, textiles, chemicals, or additional similar categories. Further, all categories could be subdivided in terms of total annual sales volume. Additionally, much more specific client profile groupings may of course be comprised.

It has been discovered that determining a client profile in this manner makes the process of providing telecommunication service pricing much more efficient. Clients within a group have been found to have similar requirements, to have similar existing communications infra-structures, and to have similar general phone usage patterns. As an example, it has been discovered that clients within the manufacturing group tend to have robust intra-company data networks, and have a high proportion of their overall phone traffic comprising intra-company phone calls. Clients in the retail group, on the other hand, have been discovered to have much less capable and only limited intra company data networks, and have intra-company phone traffic that comprises a much smaller proportion of their total phone usage.

Using the client specified client profile, a questionnaire is then selected at 6 from a questionnaire database 7. It is noted that as used herein the term "questionnaire" is intended only to refer to one or more questions, and is not otherwise intended to be limited to any particular format. The particular questionnaire selected will correspond to the client profile selected. Depending on that profile, the questionnaire will present questions designed to obtain the required information from a client fitting that particular profile. The questionnaire database is preferably stored in the memory of a computer connected to the computer network. The questionnaire is then transmitted to the client over the computer network at 8.

A preferred example of the method of the invention in practice for these above described steps comprises the client selecting an appropriate icon on a web page corresponding to their client profile, clicking on the icon, and being linked to an additional web page that contains that client profile questionnaire.

The client response to the questionnaire is obtained at 10, and a phone bill is obtained at 12. The phone bill is preferably obtained over the data network, but may also be submitted via manual delivery. It has been discovered that in practice phone bills for corporate clients in digital form are often of a very large size which may not be practical to submit over data networks, depending on the speed of transmission available. As speeds of transmission increase in the coming years, however, it is anticipated that even very large bills may be transmitted over the computer network.

A call traffic pattern is developed at 14. The call traffic pattern generally comprises an analysis of the client's phone usage, and will be discussed in greater detail below with reference to the various examples of the method of the invention. The call traffic pattern and the response to the questionnaire are used at 16 to determine telecommunications service pricing, with the resultant pricing transmitted to the client over the data network at 18. It is noted that as used herein the term "transmitted" is intended only in reference to a general communication, and is not intended to be limited to any single form of transmission. As discussed above, a preferred embodiment of the method of the invention involves transmission in the various steps of the invention to occur over a worldwide computer network, such as the world wide web. In this embodiment, "transmission" generally refers to the process of displaying information on virtual "pages"—or web pages as they are commonly known.

A. First Example Embodiment: Intra-company Phone Service Pricing

In a first example embodiment of the invention, the telecommunications service to be provided comprises providing intra-company phone service in a digital format over a data network. The data network may comprise an existing data network connecting a plurality of company facilities, or it may comprise a virtual private network created specifically to carry the phone traffic. Creation of such a network may comprise leasing of digital lines between facilities and providing servers, gateways, directory servers, firewalls and other equipment as is generally known in the art. The virtual private network may likewise comprise an existing worldwide data network, such as the internet.

The flow chart of FIG. 1 illustrates the various steps of the method of the invention for this first example embodiment. Regardless of client profile selected, the questionnaire selected at 6 from database 7 in this example embodiment will comprise at least a request for identification by location of company facilities that are connected to an existing data network. The questionnaire selected at 6 may further preferably comprise identification of corresponding phone area code (NPA), and preferably three-digit phone number prefix (NXX), for each company location connected to the data network. As an example, assume a client has a Houston facility with a switchboard phone number of 713-544-8006, and a Chicago facility with a switchboard phone number of 312-786-9169. This client would be requested to provide the 713 NPA code and the 544 NXX code for the Houston facility, as well as the 312 NPA code and the 786 NXX code for the Chicago facility.

Within this intra-company phone service embodiment example, the questionnaire selected at 6 may comprise more specific information requests depending on the client profile specified at 4. As an example, it has been discovered that within the professional services categories of law and accounting, the volume of intra-company calls made depends to a large extent on the number of professional employees. Thus if a law firm Client Profile category was selected at 4, the questionnaire-selected at 6 would request at least the number of professional employees. It may further comprise a request for the locations and number of employees at each of the individual law firm offices, as well as the total phone volume usage for a period of time.

As another example, if a manufacturing profile had been selected, the questionnaire may request specifying which of the facilities connected to the data network are sales offices, distribution warehouses, manufacturing facilities, and which is a headquarters. It has been discovered that such information can be used to develop a model for intra-company phone usage for manufacturers.

Likewise, if a retail profile had been specified, the questionnaire may request number and location of retail outlets, number and location of distribution warehouses, number and location of administrative locations, and annual retail sales. It has been discovered that these factors may be used to develop a model of intra company phone usage.

Figure 2:
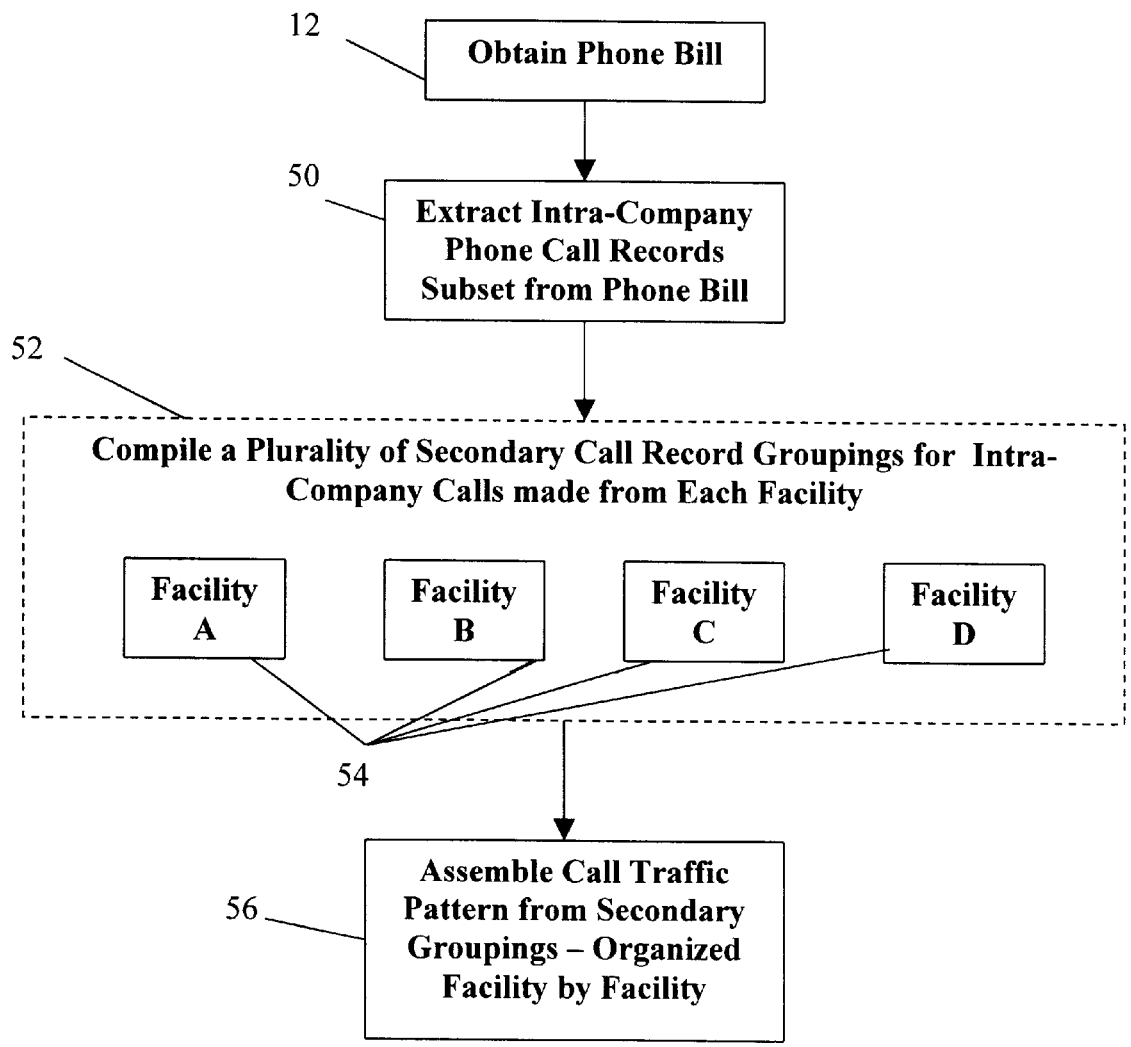
FIG. 2 is a flowchart illustrating the steps of developing an intra-company call traffic pattern.

In this first example embodiment of the method of the invention, the call traffic pattern developed at 14 would comprise an analysis of intra-company phone traffic usage by facility of origin. The development of such a traffic pattern is illustrated in FIG. 2. The company phone bill is obtained over the computer network at 12, which corresponds to node 12 of FIG. 1. The company phone bill preferably comprises a digital collection of all call records billed to the company for a period of time. The period of time preferably comprises at least three months, and more preferably comprises a year. It has been discovered that longer periods of time result in more accurate call traffic patterns as seasonal and other irregular usage patterns are averaged out. Examples of such digital phone bills include, but are not limited to, Digital Edge from AT&T, and similar digital bills from MCI and Sprint. The bills generally comprise a plurality of records having an origination number corresponding to the phone from which the call originated from, a destination number which the call was placed to, a time duration, and a charge.

A record of intra-company calls is extracted at 50. This extraction preferably comprises comparing the termination number from each call record with known NPA and NXX company numbers. If NPA and NXX numbers are not known, they may be determined by examining call record origination numbers. For instance, the termination number from each record can be compared with the origination number from each individual record. In this case, comparisons are preferably made on NPA and NXX portions of originating and terminating numbers only.

A plurality of secondary Call Record Groupings are assembled from the intra-company set at 52. These groupings generally comprise intra-company calls originating from each individual facility. As an example, FIG. 2 illustrates four groupings 54 corresponding to intra-company calls placed from a company Facility A, Facility B, Facility C, and Facility D.

At 56, the Intra-company call traffic pattern is assembled by totaling the phone traffic for each individual facility grouping. The Intra-company call traffic pattern thus may comprise the total volume of intra company calls from Facility A, Facility B, Facility C, and Facility D. Volume may be measured in time duration, number of calls, or total charges. The determination of a call traffic pattern is preferably performed by a computer connected to the computer network.

For a more detailed discussion of determining a call traffic pattern, reference is made to co-pending U.S. application Ser. No. 09/432,521; filed Nov. 3, 1999; herein incorporated by reference.

Referring again to FIG. 1, the call traffic pattern and the client supplied response to the questionnaire are then used at 16 to determine intra-company telephony service pricing to the client. Through the method of the invention, the call traffic pattern will provide hard data indicating volume of intra-company call traffic, as well as an indication of which company facilities have higher and lower concentrations of intra-company call generation. The call traffic pattern data can also be used to determine the required design configuration for a data network to be used to carry the intra-company telephony traffic. For a more detailed discussion of network configuration for carrying intra-company call traffic in a digital format, reference is made to co-pending U.S. application No. Ser. 09/356,287; filed Jul. 16, 1999; herein incorporated by reference.

These factors as indicated by the call traffic pattern can be used to determine service pricing. The cost the client currently incurs for intra company calls indicates an amount that may be saved through provision of the service, and thereby indicates an amount that the service may be worth to the client. An analysis of call traffic between each individual of the company facilities can be used to determine gateway, server, and related network hardware required at each facility, and required network bandwidth between respective facilities.

Responses to the questionnaire likewise are used to determine intra-company digital telephony service pricing at 16. Responses to the questionnaire may indicate, for instance, if there are any company facilities that are not connected to an existing data network. Additional expense would be incurred to connect these facilities to a data network. As an additional example, as discussed above, it has been discovered that for certain professional services client profile categories the volume of intra-company phone traffic depends closely on the number of professional employees and their office locations. Thus this information from the questionnaire may be used, either as a supplement to or as a replacement for, the call traffic pattern to determine service pricing.

It is noted that the particular method of determination of pricing will of course vary somewhat depending on market conditions. Other factors in determining a service price in addition to the call traffic pattern and the questionnaire response will also of course need to be considered, and may comprise, for example, costs of required equipment procurement, installation, related shipping and travel expenses, and desired profit margin. It is thus expressly noted that the method of the invention may comprise analysis of additional factors in addition to using the call traffic pattern and the questionnaire response in price determination.

Finally, pricing for the intra-company digital telephony service is presented over the network to the client at 18.

B. Second Example Embodiment: Reverse Charge Call Service Pricing

In a second example embodiment of the invention, the telecommunications service to be provided comprises providing reverse charge call service to a client. As an example, a corporate client may have a toll free number, such as an "800" number, by which consumers can call the corporate client toll free. Charges for the call are billed to the terminating number (corporation), which generally comprises a reverse charge call center, instead of the originating number. Charges for such calls vary with the location of the originating call.

Recent technologies have provided opportunities to achieve significant savings on such calls. As an example, instead of carrying the call from the originating phone over a public switched network (PSN), the call may be routed from the originating phone to a data network, converted to digital format, and transmitted to the destination corporate reverse charge call center. The data network may comprise a company data network, a virtual private network, or a worldwide computer network such as the internet. Such a process provides significant savings for the call transmission over routing the call over the PSN with associated local exchange carrier (LEC) and long distance carrier (LDC) charges. Greater detail regarding methods for reduced cost reverse charge call service are provided in co-pending U.S. Application filed Jan. 18, 2000 by Kohler et al., entitled METHOD FOR PROVIDING REVERSE CHARGE PHONE SERVICE; herein incorporated by reference.

It is noted that as used herein the term "reverse charge call center" is intended to refer to a destination phone at which reverse charge calls are answered. As an example, a client company may have a customer service center at which customer service representatives respond to 800 number phone calls. It is also noted that a given company may have several reverse charge call centers.

In this example embodiment of the method of the invention, the questionnaire selected at 6 in FIG. 1 and presented at. 8 comprises at least the location of the client reverse charge call center, regardless of the client profile selected at 6. In addition, the company phone bill obtained at 12 will comprise at least the records of reverse charge call records billed to the client. Also, the call traffic pattern developed at 14 in this example embodiment will comprise a reverse charge call traffic pattern.

Figure 3:
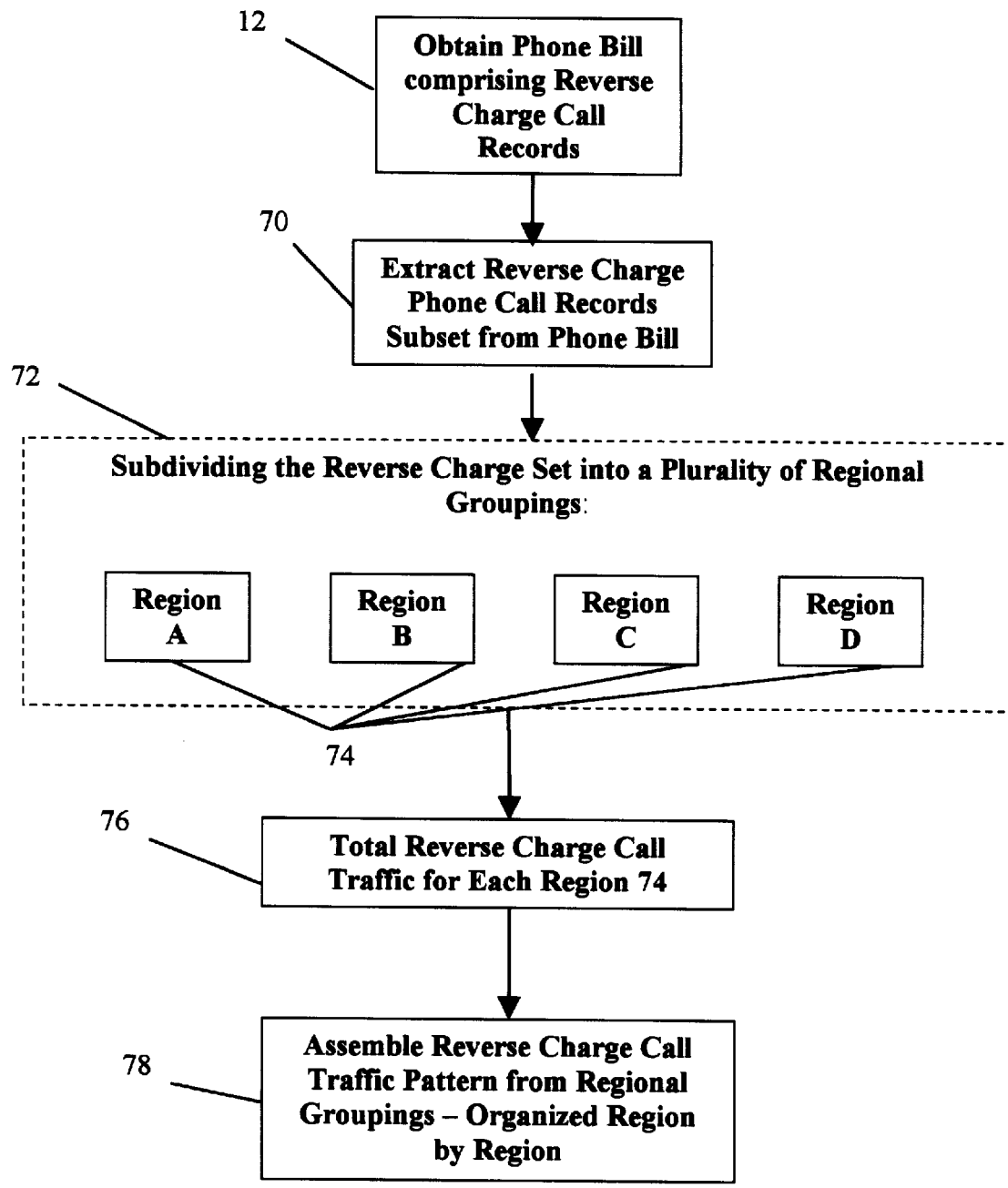
FIG. 3 is a flowchart illustrating the steps of developing a reverse charge call traffic pattern.

FIG. 3 illustrates the individual steps of developing a reverse charge call traffic pattern. A company phone bill is obtained at 12 that comprises reverse charge call records for a period of time. The phone bill is preferably in digital format, and comprises a plurality of reverse charge call records each with an associated origination number, duration, and charge. Preferably, the reverse charge phone bill includes only reverse charge calls. Should it comprise additional call records, a set of reverse charge call records is extracted at 70. Extraction may occur by sorting the call records while looking for a reverse charge indicator, for instance what is generally known as a "flag".

Once a reverse charge call record set has been created at 70, subdivision occurs at 72 into a plurality of regional groupings 74. The regional groupings 74 comprise groups of call records from a geographical region. As an example, FIG. 3 illustrates regional groupings comprising four regions 74: region A, B, C, and D. By way of example, these groupings may comprise the East Coast, Midwest, South, and West Coast. In practice, a plurality of groups will likely be comprised that preferably refer to geographic regions of greater precision that may comprise, for example, a LATA. These groups are assembled by sorting the reverse charge call records and assigning call records with a given NPA code to a respective group. That is, call records having an originating number with an NPA code of 312 (Chicago) would be assigned to the "Midwest" group.

At 76, the reverse charge call traffic is totaled for each individual region 74. Call volume may be totaled by time duration, number of calls, or, preferably, by charges. At 78 the Reverse Charge Call Traffic Pattern is assembled by presenting the reverse charge call traffic totaled at 76 and organized by respective regions 74. The Reverse Charge Call Traffic Pattern thus comprises an analysis by region of origin of the reverse charge call traffic the client is receiving.

The resulting reverse charge call traffic pattern provides a useful analysis for determination of reverse charge call service pricing. As an example, the reverse charge call traffic pattern can be used to determine how many points of presence (POPS) for digital conversion and transmission of reverse charge call traffic and in which regions 74 they should be deployed. Further, the reverse traffic pattern will also indicate the cost associated with the reverse charge call service the client is currently paying. This can be an indicator of an amount the client will be willing to pay for reverse charge service. The reverse charge call traffic pattern can also indicate patterns of usage, including peak times of reverse charge call occurrence, which can be used to determine overall required staffing, network bandwith, equipment, and related requirements.

Greater detail regarding developing a reverse charge call traffic pattern and regarding using a reverse charge call traffic pattern to determine service pricing is presented in co-pending U.S. Application filed Jan. 18, 2000 by Kohler et al., entitled METHOD FOR PROVIDING REVERSE CHARGE PHONE SERVICE; which was incorporated by reference above.

Finally, pricing for the intra-company digital telephony service is determined by use of the reverse charge call traffic pattern at 16 in FIG. 1, and is presented over the computer network to the client at 18.

C. Third Example Embodiment: Reverse Charge Call Service Pricing

In a third example embodiment of the method of the invention, the telecommunications service to be priced also comprises reverse charge call service as in the second example. In this third example embodiment, however, no particular client profile is selected. This is because it has been discovered that in the particular case of reverse charge call service, the determining factors in providing pricing may be independent of particular client profile. Thus this step can be eliminated in a particular embodiment of the invention in order to simplify the method. It is noted, however, that the step of specifying a client profile may still be included when providing pricing for reverse charge call service as discussed above in reference to the second example embodiment of the invention.

Figure 4:
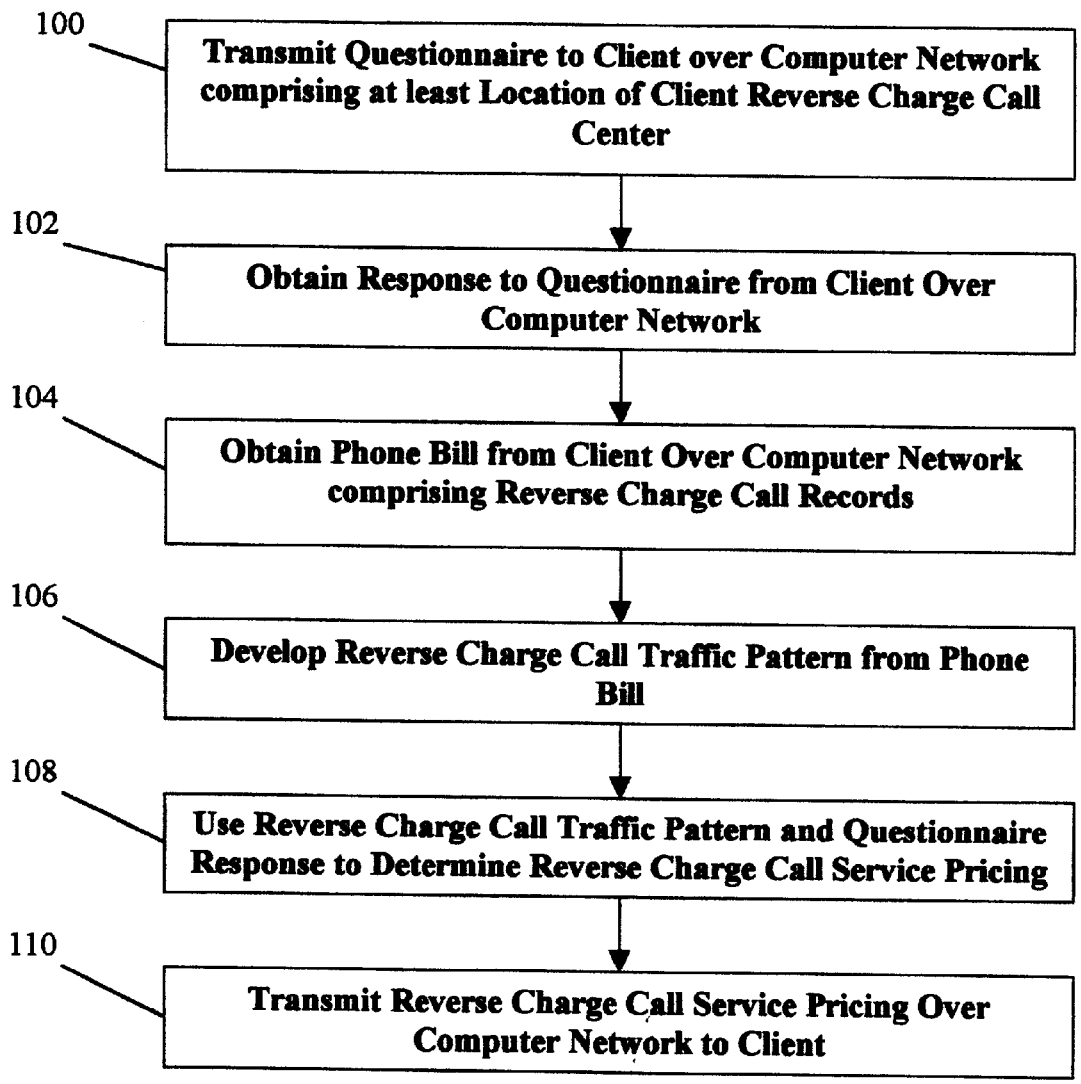
FIG. 4 is a flowchart illustrating the steps of a third example embodiment of the method of the invention.

FIG. 4 is a flowchart illustrating the steps of this third example embodiment of the invention. At 100 a questionnaire is presented to the client over the computer network comprising at least a request for the location of the client's reverse charge call center, which is responded to at 102 over the computer network. A client phone bill comprising at least reverse charge call records is obtained at 104. Using the client phone bill, a reverse charge call traffic pattern is developed at 106. The preferred reverse charge call traffic pattern comprises an analysis by geographic region of origin of reverse charge calls made to the client. A preferred reverse charge call traffic pattern is discussed in greater detail herein above with reference to the second example embodiment of the method of the invention, and illustrated in flowchart form in FIG. 3.

The reverse charge call traffic pattern and the response to the questionnaire are used at 108 to determine reverse charge call traffic service pricing as discussed herein above in reference to the second example embodiment of the method of the invention. Service pricing is then transmitted to the client over the computer network at 110.

D. Fourth Example Embodiment: Reverse Charge and Intra-company Service Pricing

A fourth example embodiment of the method of the invention generally comprises a combination of the first and second example embodiments as described herein. In this fourth example embodiment, pricing is provided for both reverse charge and intra-company telecommunications services. In this embodiment of the invention, the client questionnaire, regardless of the profile chosen, will request at least the locations of company facilities and the location of a company reverse charge call center. A company phone bill corresponding to a period of time will be obtained, with the bill comprising at least a record of long distance call made from the company and reverse charge calls billed to the company. As reverse charge calls may be billed separately, two or more phone bills may be obtained.

Two call traffic patterns are then developed from the phone bill(s). An intra-company call traffic pattern is developed that corresponds to the call traffic pattern discussed herein with reference to the first example embodiment of the invention and with reference to FIG. 2. A reverse charge call traffic pattern is also developed, which corresponds to the call traffic pattern described herein with reference to the second example embodiment and FIG. 3.

The call traffic patterns are then used with the response to the questionnaire to determine telecommunications service pricing as generally discussed herein.

An alternate embodiment of this fourth example eliminates the step of using a client profile for the reasoning as generally discussed herein with reference to the third example embodiment.

E. Fifth Example Embodiment: intra-company and all long distance traffic

In a fifth example embodiment of the invention, the telecommunications service to be provided comprises a combination of intra-company call traffic and all long distance traffic. In this example embodiment, no phone bill is obtained from the client. Instead, the client profile questionnaire presented, regardless of the client profile selected, comprises at least a request for total long distance phone usage for the client for a period of time. Phone usage is preferably provided in total minutes.

Depending on the profile selected, assumptions may then be made to estimate the intra-company call traffic usage and the overall long distance usage proportions of the total long distance usage. As an example, it has been discovered that for a manufacturing profile, approximately 30% of total long distance volume is intra-company long distance. Client profile specific long distance consumption is summarized below in Table 1:

TABLE 1

| Client Profile: | Intra-company proportion of total long distance minutes: | Extra-company proportion of total Long Distance Minutes |
|---|---|---|
| Manufacturing | 25–30% | 70–75% |
| Retail | 1–5% | 95–99% |
| Professional Service | 10–30% | 70–90% |
| Government | 30–50% | 50–70% |
| Utilities | 20–35% | 65–80% |

Thus once a client specifies a client profile and a total long distance usage value, the method of the invention may be used to determine ranges for intra-company usage by the client. These values may be used to provide estimates for pricing of services to the client, or may be used directly as pricing. As an example, with the calculated total extra-company long distance usage, a basis for volume discounting is established. Additionally, once the intra-company call usage is calculated and the number of company facilities is known, estimates for traffic between the individual facilities may be made. Equipment, network, and other requirements may be then estimated and used for a quotation basis.

The method for estimating intra and extra long distance usage proportions as described herein with reference to this fifth example embodiment may provide a useful complement to or alternative to developing a call traffic pattern in the method of the invention. As an example, if a "budgetary" cost estimate is required quickly and a phone bill is not available for submission, this fifth example embodiment's method for estimating intra and extra call proportions based on selected client profile may be of use.

Through the method of the invention as described herein with reference to the various example embodiments, telecommunications vendors are thus able to obtain required information to determine service pricing in a timely and efficient manner. As information is generally provided over a computer network, significant travel and time savings are achieved. Because the method is automated, significant savings are also achieved in reduced sales staffing requirements. In addition, pricing can be provided within seconds or minutes. This is a significant improvement over methods of the prior art which could require months to present pricing as salespeople were required to gather required information from remote clients, transmit the information to a centralized pricing group, and then present pricing to the client after obtaining it back from the centralized group.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims. As an example, it will be obvious to those knowledgeable in the art that the specific order or number of method steps as disclosed herein could be altered somewhat without change to the underlying spirit and scope of the invention. Further, although examples illustrating the method of the invention with telecommunications services comprising reverse charge call service and intra-company call service, the method of the invention may likewise be practiced with other services, which may comprise, by way of example, long distance services, call forwarding, caller identification, voice mail, or video communications.

What is claimed is:

1. A method for providing telecommunications service pricing to a client over a computer network, wherein the telecommunications service comprises intra-company digital telephony over a data network and reverse charge call service over a data network, the method comprising the steps of:
   a) determining at least the location of a client reverse charge call center and the location of the company facilities;
   b) obtaining a client phone bill for a period of time, said phone bill comprising a record of reverse charge calls made to the client company, said phone bill further comprising a record of calls made from said client company;
   c) developing an intra-company call traffic pattern from said company phone bill;
   d) developing a reverse charge call traffic pattern from said company phone bill; and
   e) using said intra-company call traffic pattern and said reverse charge call traffic pattern to determine pricing for the telecommunications service.

2. A method for providing telecommunications service pricing to a corporate client over a computer network, the corporate client having a plurality of geographically remote facilities, the service comprising intra-company digital telephony over a data network, the method for providing pricing comprising the steps of:
   a) querying the client to select a client profile from a profile group; obtaining a response from the client to said query;
   b) using said client profile to choose a telecommunications service questionnaire from a questionnaire database; said questionnaire requesting at least the locations of company remote facilities;
   c) presenting said questionnaire to the client over the computer network;
   d) obtaining a response to said questionnaire from the client over the computer network;
   e) obtaining a phone bill from the client over the computer network;
   f) using said phone bill to develop a call traffic pattern, said traffic pattern comprising an analysis of intra-company calls organized by company facility of origin;
   g) using said questionnaire response and said call traffic pattern to determine telecommunications service pricing; and
   h) providing said telecommunications service pricing over the computer network to the client.

3. A method for providing reverse charge phone service pricing to a corporate client over a computer network, the corporate client having at least a reverse charge call center, the method comprising the steps of:
   a) presenting a reverse charge call service questionnaire to the client over the network; said questionnaire requesting the location of the reverse charge call center,
   b) obtaining a questionnaire response from the client over the network;
   c) obtaining a client phone bill over the network; said phone bill comprising reverse charge call records;
   d) developing a reverse charge call traffic pattern from said phone bill, said reverse charge call traffic pattern comprising an analysis of reverse charge call origination by geographic region;
   e) using said reverse charge call traffic pattern and said questionnaire response to determine telecommunications service pricing; and
   f) providing said telecommunications service pricing over the data network to the client.

4. A method for providing telecommunication service pricing to a corporate client over a computer network, the corporate client having at least one reverse charge call center, wherein the telecommunications service comprises providing reverse charge telephony service over a data network, the method comprising the steps of:
   querying the client to select a client profile from a profile group, obtaining a client profile in response to said query from the client;
   using said client profile to choose a telecommunications service questionnaire from a questionnaire database, said questionnaire requesting at least the location of one reverse charge call center, presenting said questionnaire to the client over the network,
   requesting a phone bill from the client, obtaining a phone bill from the client, using said phone bill to develop a reverse charge call traffic pattern, obtaining a response to said questionnaire from the client over the network, using said response and said phone bill to determine telecommunications service pricing; and
   providing said telecommunications service pricing over the data network to the client.

5. A method as in claim 4, wherein said reverse charge call traffic pattern comprises an analysis by geographical region of origin of reverse charge call origination.

6. A method as in claim 5, wherein said phone bill comprises at least a record of reverse charge calls made to the company, and wherein said step of developing a reverse charge call traffic pattern comprises:
   subdividing said reverse charge call records into a plurality of geographical regional groupings, each of said regional groupings comprising reverse charge call records originating from within a geographical region; and
   totaling reverse charge call volume for each of said geographical regional groupings; said call traffic pattern comprising a list of said geographical regional grouping volume totals.

7. A method for providing telecommunication service pricing to a corporate client over a computer network, the corporate client having a plurality of geographically remote facilities, wherein the telecommunications service comprises providing intra-company telephony service over a data network, the method comprising the steps of:
   querying the client to select a client profile from a profile group, obtaining a client profile in response to said query from the client;

using said client profile to choose a telecommunications service questionnaire from a questionnaire database, said questionnaire requesting at least the number of client geographically remote locations, presenting said questionnaire to the client over the network;

obtaining a response to said questionnaire from the client over the network;

requesting a client phone bill for a period of time;

using said phone bill to develop a call traffic pattern;

using said response and said traffic pattern to determine telecommunications service pricing; and providing said telecommunications service pricing over the data network to the client.

8. A method as in claim 7, further comprising programming a computer connected to the data network to develop said call traffic pattern.

9. A method as in claim 7, wherein the telecommunications service comprises providing intra-company calls over a data network, and wherein said call traffic pattern comprises an analysis of intra-company call records organized by company facility.

10. A method as in claim 7, wherein said step of developing a call traffic pattern comprises:

extracting a set of intra-company call records from said phone bill;

subdividing said set of intra-company call records into a plurality of groups, each of said groups corresponding to calls originating from a respective company facility; and totaling call volume for each of said plurality of groups; said call traffic pattern comprising a listing of intra-company call volume totals for each of said groups.

11. A method as in claim 10, wherein said phone bill is obtained over the computer network.

12. A method for providing pricing to a corporate client over a computer network for intra-company digital telephony over a data network and reverse charge call service over a data network, the corporate client having a plurality of geographically remote facilities, wherein the telecommunications service comprises providing intra-company telephony service over a data network, the method comprising the steps of:

querying the client to select a client profile from a profile group, obtaining a client profile in response to said query from the client;

using said client profile to choose a telecommunications service questionnaire from a questionnaire database, said questionnaire requesting at least the number of client geographically remote locations, the location of a client reverse charge call center, and the location of the company facilities presenting said questionnaire to the client over the network;

obtaining a response to said questionnaire from the client over the network;

obtaining a client phone bill for a period of time, said phone bill comprising a record of reverse charge calls made to the client company, said phone bill comprising a record of calls made from said client company;

developing an intra-company call traffic pattern from said company phone bill;

developing a reverse charge call traffic pattern from said company phone bill; and using said intra-company call traffic pattern and said reverse charge call traffic pattern with said questionnaire response to determine pricing for the telecommunications service.

13. A method as in claim 12, wherein said step of developing said intra-company call traffic pattern comprises:

extracting a set of intra-company call records from said phone bill;

subdividing said set of intra-company call records into a plurality of groups, each of said groups corresponding to calls originating from a respective company facility; and totaling call volume for each of said plurality of groups; said call traffic pattern comprising a listing of intra-company call volume totals for each of said groups.

14. A method as in claim 12, wherein said phone bill comprises at least a record of reverse charge calls made to the client; and wherein said step of developing a reverse charge call traffic pattern comprises:

subdividing said reverse charge call records into a plurality of geographical regional groupings, each of said regional groupings comprising reverse charge call records originating from within a geographical region; and totaling reverse charge call volume for each of said geographical regional groupings; said call traffic pattern comprising a list of said geographical regional grouping volume totals.

15. A method as in claim 12, wherein said step of obtaining said phone bill comprises obtaining said phone bill over the computer network.

16. A method as in claim 12, wherein said period of time is at least 3 months.

* * * * *